(12) United States Patent
Lim et al.

(10) Patent No.: US 6,913,982 B2
(45) Date of Patent: Jul. 5, 2005

(54) METHOD OF FABRICATING A PROBE OF A SCANNING PROBE MICROSCOPE (SPM) HAVING A FIELD-EFFECT TRANSISTOR CHANNEL

(76) Inventors: Geunbae Lim, 235-1205 Hwanggol Maeul Poonglim Apt., 1053-2 Youngtong-dong Paldal-gu, Suwon-city, Kyungki-do (KR); Yukeun Eugene Pak, 408-606 Hyundai Apt., 92 Seohyun-dong, Bundang-gu, Seongnam-city, Kyungki-do (KR); Jong Up Jeon, 111-105 Jugong 2-danji Apt., 990 Maetan-dong, Paldal-gu, Suwon-city, Kyungki-do (KR); Hyunjung Shin, 314-1404 Kachi Maeul Apt., 66 Gumi-dong, Bundang-gu, Seongnam-city, Kyungki-do (KR); Young Kuk, 802-201 Dongik Apt., 738 Suseo-dong Gangnam-gu, Seoul (KR)

( * ) Notice: Subject to any disclaimer, the term of this patent is extended or adjusted under 35 U.S.C. 154(b) by 91 days.

(21) Appl. No.: 10/336,068

(22) Filed: Jan. 2, 2003

(65) Prior Publication Data

US 2003/0107058 A1 Jun. 12, 2003

Related U.S. Application Data

(62) Division of application No. 09/851,411, filed on May 8, 2001, now Pat. No. 6,521,921.

(51) Int. Cl.$^7$ .............................................. H01L 21/331
(52) U.S. Cl. ...................... 438/378; 438/512; 438/514; 438/308
(58) Field of Search ................................. 438/510, 512, 438/514, 515, 517, 526, 308, 378

(56) References Cited

U.S. PATENT DOCUMENTS

| | | | |
|---|---|---|---|
| 5,923,033 A | | 7/1999 | Takayama et al. |
| 6,011,261 A | * | 1/2000 | Ikeda et al. .................. 250/306 |
| 6,415,653 B1 | * | 7/2002 | Matsuyama .................. 73/105 |

FOREIGN PATENT DOCUMENTS

JP         8086788    *   4/1996    .......... G01N/37/00

* cited by examiner

Primary Examiner—Carl Whitehead, Jr.
Assistant Examiner—Yennhu B. Huynh
(74) Attorney, Agent, or Firm—Knobbe, Martens, Olson & Bear LLP

(57) ABSTRACT

A probe of a scanning probe microscope (SPM) having a field-effect transistor (FET) structure at the tip of the probe, and a method of fabricating the probe are provided. The SPM probe having a source, channel, and drain is formed by etching a single crystalline silicon substrate into a V-shaped groove and doping the etching sloping sides at one end of the V-shaped groove with impurities.

4 Claims, 8 Drawing Sheets

METHOD OF FABRICATING A PROBE OF A SCANNING PROBE MICROSCOPE (SPM) HAVING A FIELD-EFFECT TRANSISTOR CHANNEL

CROSS REFERENCE TO RELATED CASE

The present application is a divisional application of U.S. patent application Ser. No. 09/851,411, filed on May 8, 2001 now U.S. Pat. No. 6,521,921.

BACKGROUND OF THE INVENTION

1. Field of the Invention

The present invention relates to a probe of a scanning probe microscope (SPM), having a tip formed as a field effect transistor (FET) channel, and a method of fabricating the same.

2. Description of the Related Art

Various kinds of microscopes capable of measuring different types of physical quantities by scanning with a probe are referred to as scanning probe microscopes (SPMs).

An SPM basically includes a probe with a sharp tip (having a radius of curvature of 10 nm or less, a scanner for scanning a sample with the probe, and a control and information process system for controlling the probe and scanner and processing signals. A variety of different types of SPMs have been developed. The operation principle of the probe varies depending on the physical quantity to be measured. Different types of SPMs include a scanning tunneling microscope using a current flow due to voltage difference between the tip and the sample, an atomic force microscope using various types of atomic forces existing between the tip and the sample, a magnetic force microscope using a force exerted between the magnetic field of the sample and the magnified tip, a scanning near-field optical microscope whose resolution limit to visible wavelength is improved, and an electrostatic force microscope (EFM) using electrostatic force acting between the sample and the tip. A variety of different types of tips are available for measuring a variety of samples with great precision. With the SPMs based on the variety of operation principles, which are initially devised for the purpose of topology measurement, physical characteristics such as the friction coefficient, thermal conductivity, magnetic domain, ferroelectric domain, electric potential difference, and electrochemical characteristic, as well as the topology characteristic, can be measured with great precision.

Figure 1:
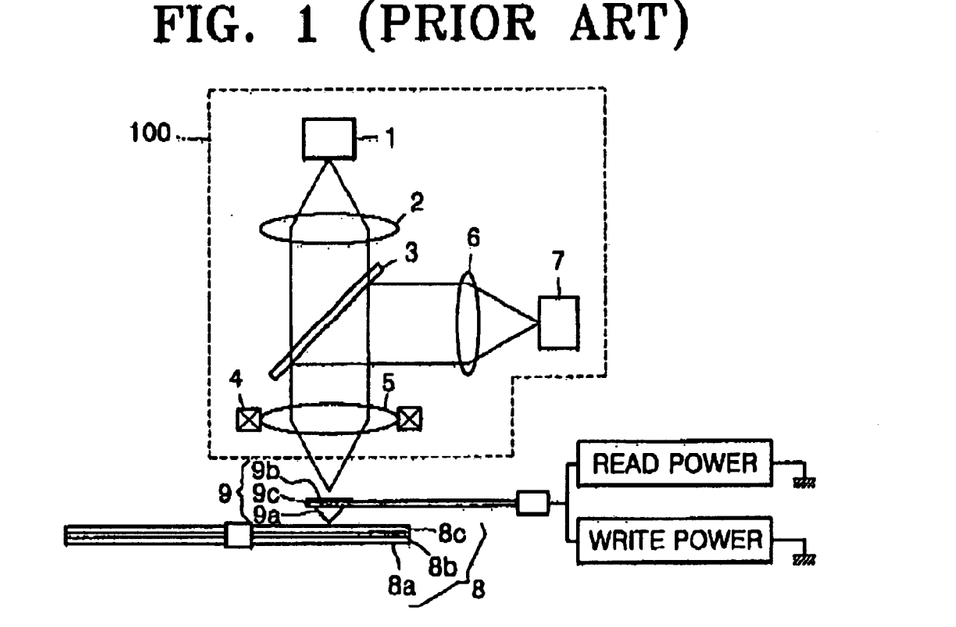
FIG. 1 is a schematic view of a disc apparatus using a conventional scanning probe microscope (SPM) probe.

FIG. 1 is a schematic view of a disc apparatus using a conventional SPM probe. The disc-type recording/reproduction apparatus using the SPM probe includes a disc 8 having a circular substrate, an electrode layer deposited on the substrate, and a ferroelectric layer deposited on the electrode layer; a head 9 having a microtip for recording information onto the ferroelectric layer by dielectric polarization and reading information therefrom while vertically moving within the range of λ/4 (λ is light wavelength over the disc surface depending on the polarities, and a light beam reflecting means; and an optical system 100 for detecting the recorded information from the optical path difference by the vertical movement of the head 9.

In particular, referring to FIG. 1, the electrode layer 8b, and the ferroelectric layer 8c on which information is recorded by dielectric polarization are sequentially stacked on the circular substrate 8a of the disc 8. The head 8 formed as an SPM probe includes the microtip 9a for directly recording information on the ferroelectric layer 8a by dielectric polarization, and reading information from the ferroelectric layer 8a while vertically moving within the range of λ/4 over the disc surface depending on the polarities, the reflector 9b for reflecting a light beam, and a support arm 9c for supporting the microtip 9a and the reflector 9b. The optical system 100 includes a laser diode 1 as a light source, a collimating lens 2 for collimating the light beam emitted from the light source 1, a beam splitter 3 for passing the parallel light beam and splitting a light beam reflected from the disc surface; an objective lens 5 for focusing the incident parallel beam on a track of the disc surface to a diffraction limit, a condensing lens 6 for condensing a reflected beam, and a photodetector 7 for converting the condensed reflected beam into an electric signal.

The operational principle of the disc apparatus having the configuration described above is as follows.

As a small region of the ferroelectric layer deposited on an electrode plate is polarized by moving the microtip electrode to which a constant voltage is applied, a polarized region, and a non-polarized region or inversely polarized region can be distinguished from the difference in electrostatic force therebetween. An electrostatic force is exerted upon the microtip of the head to which a constant voltage is applied, which varies depending on the intensity of polarization of the disc surface, and the microtip rises or falls by an amount of λ/4 or less. Here, only a light beam with an optical path variation of λ/2 is split by the beam splitter 3 and is detected by the photodetector 7.

Figure 2:
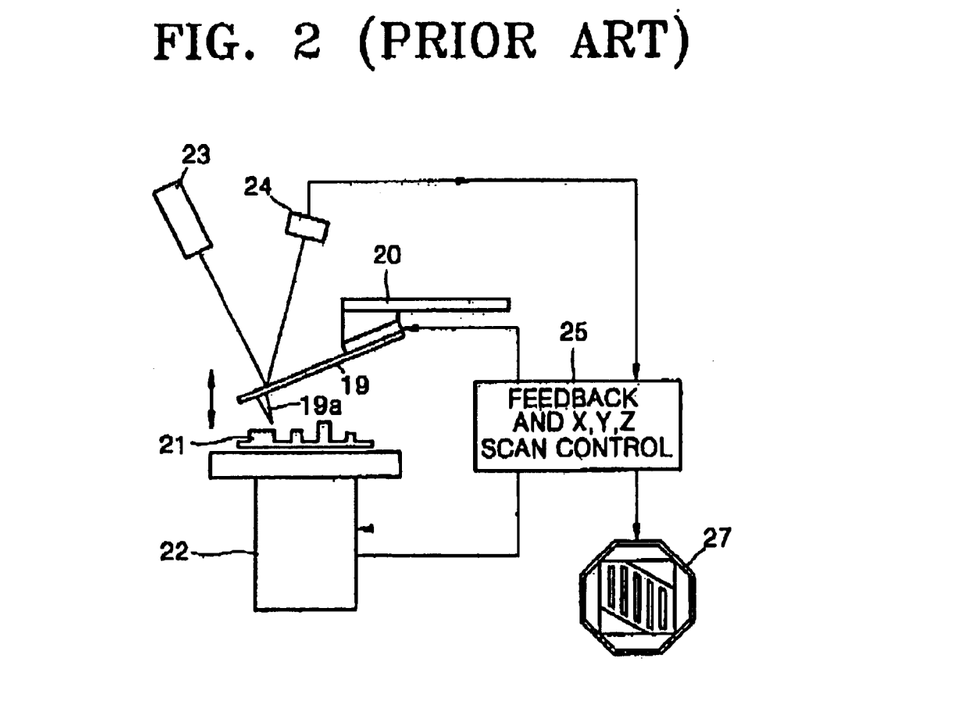
FIG. 2 is a schematic view of a morphology measuring apparatus using a conventional SPM probe.

FIG. 2 is a schematic view of a morphology measuring apparatus using a conventional SPM probe. As shown in FIG. 2, as a cantilever probe 19 oscillates by a piezoelectric device 20 and a sample 21 is moved by an x-y-z scanner 22 controlled by a controller 25, a sharp tip 19a of the cantilever probe 19 scans the surface of the sample 20. Thus, the body of the cantilever probe 19 also moves up and down depending on the surface shape of the sample 20 and reflects the laser beam emitted from a laser source 23 towards a photodetector 24. The intensity of the reflected beam is detected as an electric signal to display the morphology of the sample 20 on a display 27.

As described previously, in the SPM technique of measuring a force acting between the probe and an object to be measured with mechanical devices and a laser diode, the probe tip needs to be positioned as close as possible to the object and to be extremely sharp. This SPM technique is affected by the surface flatness of a substrate used, so that it has a controlling problem. The large volume of the entire system is defective in manufacturing a miniature hard disc.

SUMMARY OF THE INVENTION

To solve the problems, it is a first object of the present invention to provide a probe of a scanning probe microscope (SPM) having a field-effect transistor (FET) channel with simple configuration, which can easily measure a force acting between a probe tip and a sample in connection with peripheral devices.

It is a second object of the present invention to provide a method of fabricating the SPM probe.

To achieve the first object of the present invention, there is provided a probe of a scanning probe microscope, having a field-effect transistor channel structure and comprising: a tip; a channel region formed by doping a center sloping portion of the tip with a first type of impurities; and a source region and a drain region formed at the sloping sides of the tip around the channel region by doping the sloping sides with a second type of impurities.

In an aspect of the second object of the present invention, there is provided a method of fabricating a probe of a scanning probe microscope having a field-effect transistor channel, the method comprising: (a) forming a tip by etching a single crystalline semiconductor substrate along a crystalline surface; (b) forming a channel region by doping a center sloping portion of the tip with a first type of impurities; and (c) forming a source region and a drain region by doping the sloping sides of the tip with a second type of impurities. It is preferable that, in step (a), a single crystalline semiconductor substrate having the (100) plane is used and is etched such that the (111) planes are exposed at the sloping sides in which the source region and drain region are to be formed.

In another aspect of the second object of the present invention, there is provided a method of fabricating a probe of a scanning prove microscope having a field-effect transistor channel, the method comprising: forming a tip by etching a single crystalline semiconductor substrate along the (100) plane, such that one end of the V-shaped groove to be a tip has a first angle and the (111) plane is exposed at the sloping sides of the V-shaped groove; forming a source region and a drain region by doping the sloping sides of the V-shaped groove with a first type of impurities; etching only a center portion of the V-shaped groove at which the sloping sides having the source and drain regions doped with the first type of impurities meet to have a second angle greater than the first angle, and to remove the first type of impurities such that a channel doped with a second type of impurities is formed at the center portion of the V-shaped groove. It is preferable that the first angle is 90 degrees and the second angle is 136 degrees.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Figure 3:
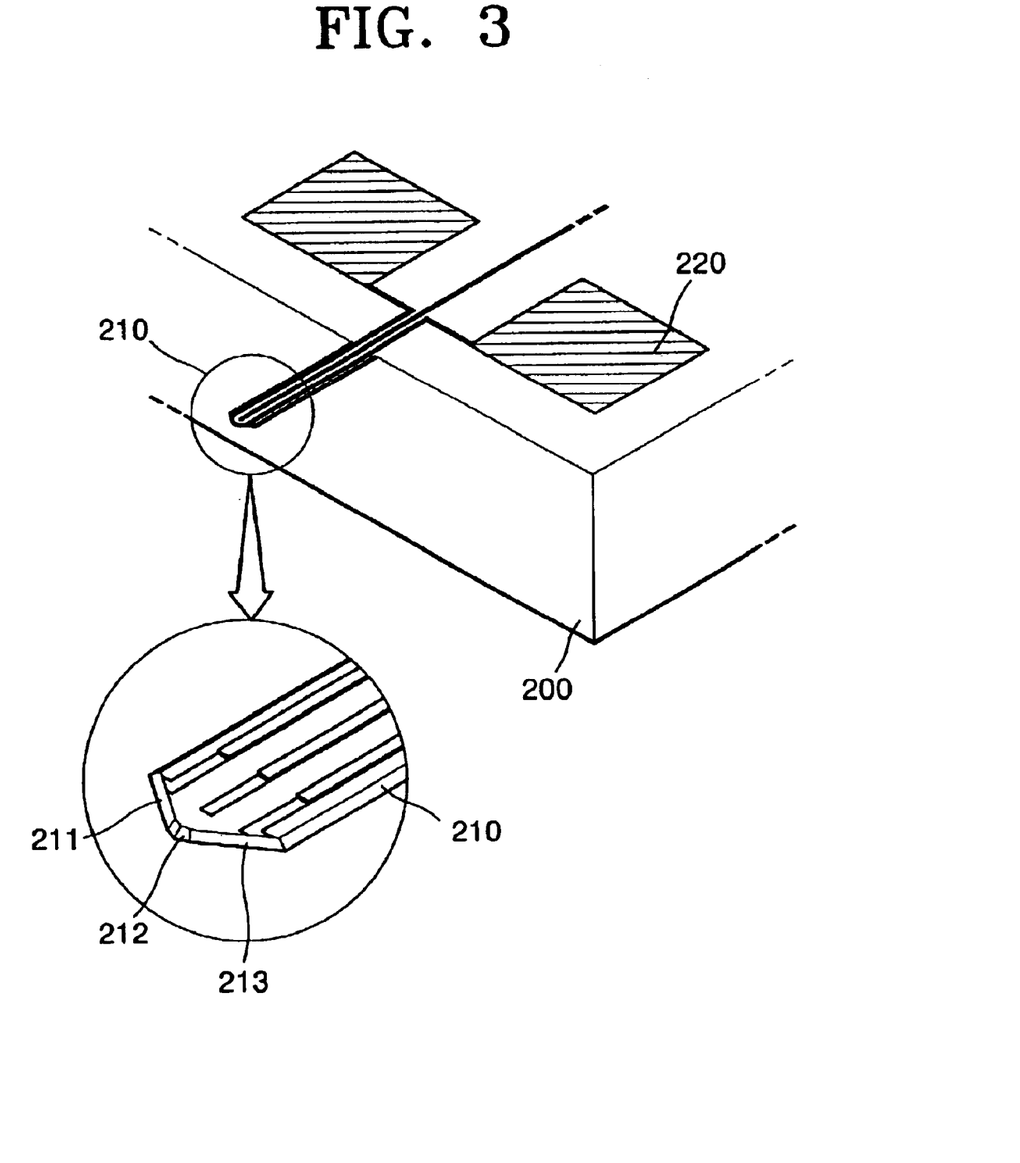
FIG. 3 is a perspective view of a preferred embodiment of a SPM probe having a field effect transistor (FET) channel according to the present invention.

Preferred embodiments of a probe of a scanning probe microscope (SPM) having a field effect transistor (FET) channel and a method of fabricating the SPM probe according to the present invention will be described with reference to the appended drawings. The structure of a SPM probe having a FET channel according to a preferred embodiment of the present invention is shown in FIG. 3. Referring to FIG. 3, a semiconductor substrate 200 is etched to form a probe structure 210 and the etched surface is doped to form a source 211, a channel 212, and a drain 213. In FIG. 3, reference numeral 220 denotes electrode pads connected to the source 220 and drain 213.

As shown in FIG. 3, with the FET channel structure formed at the tip of the probe 210 in which the distance between the source 211 and the drain 123 is adjusted, a plurality of regions of a sample having different electric charge concentrations can be sensed. The probe 210 having the FET channel can be used as a charge collector. A sample having charges at a local area can be used for a storage device. The quantity of charges collected at the local area can be measured by the probe 210.

Figure 4:
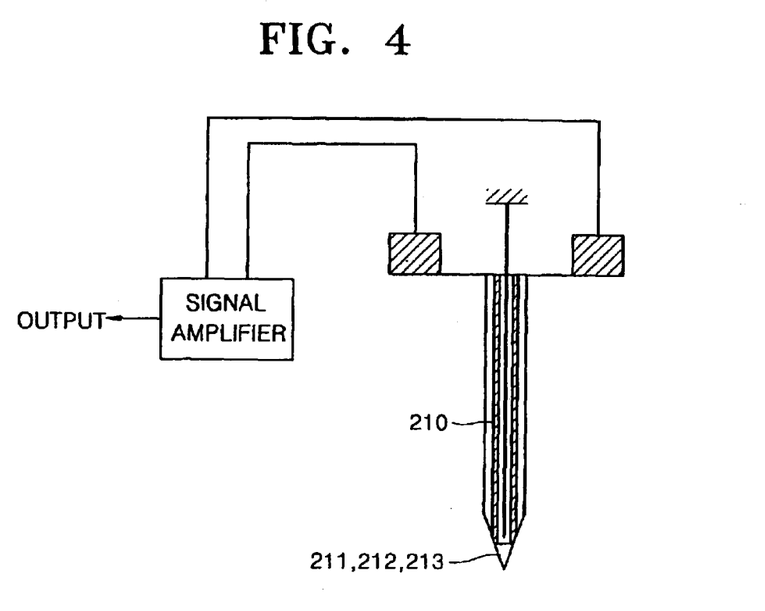
FIG. 4 is a schematic view of an SPM system to which the SPM probe having the FET channel of FIG. 3 is applied.

The probe structure having the transistor channel at its tip is based on the principle of metal oxide silicon (MOS) transistor which is highly reactive to gate voltage or charge quantity. The probe 210 has an advantage capable of directly converting the quantity of charge between the tip and the object surface into a current with a simple circuit structure as shown in FIG. 4. The conventional SPM system of FIG. 1 or 2 needs an optical system and a complex circuit system as well as a cantilever, so that the entire system is very large and the manufacturing cost is high. Unlike this conventional SPM system, the probe tip according to the present invention for an SPM system described previously can be used to measure a physical characteristic of the object by simple connection with a signal amplifier 220, as shown in FIG. 4. This is because the sensor (FET channel structure) that outputs an electric signal is directly connected to the tip, so that the electric signal can be used as an output value through amplification. The entire system can be miniaturized and thus the SPM technique can be effective in manufacturing a miniature data storage device. In addition, another advantage of the system is that the quantity of charge to be collected from an object can be controlled as needed. The amount of information erased from a hard disc can be measured with the system.

Figure 5A:
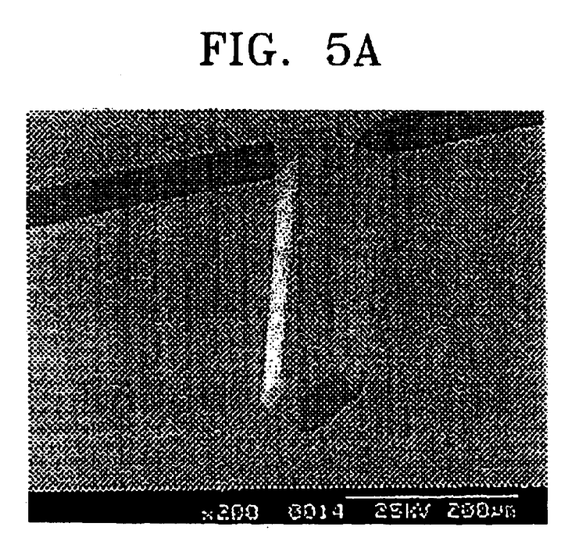
FIGS. 5A through 5C show scanning electron microscope (SEM) images of an SPM prove having the FET channel of FIG. 3, which is manufactured of a single crystalline silicon.
Figure 5B:
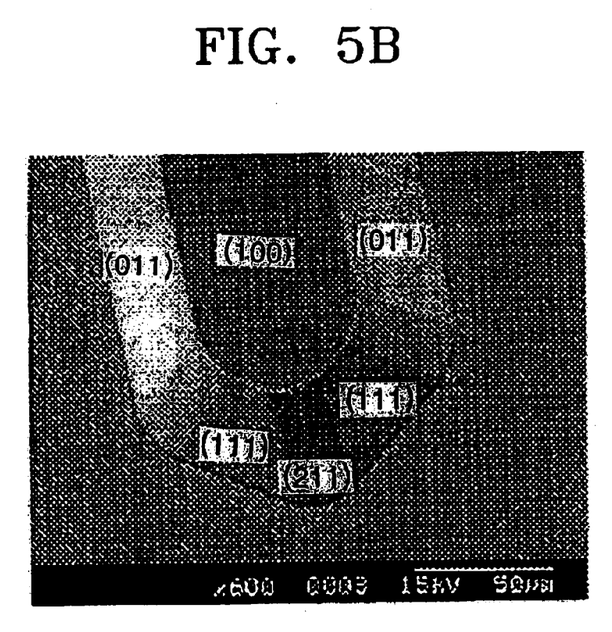
Figure 5C:
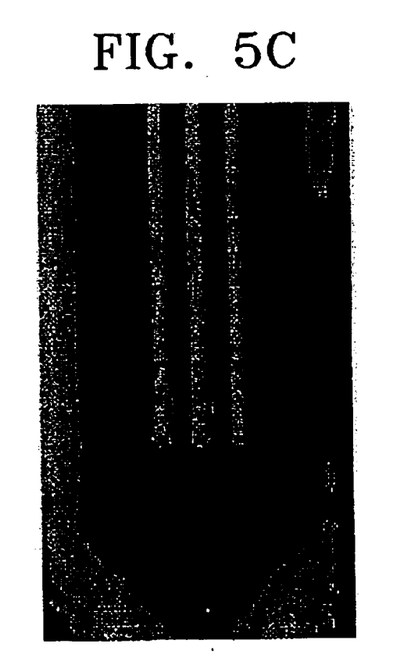

FIGS. 5A and 5B are scanning electron microscope (SEM) images of a SPM probe according to the present invention, which is manufactured of a silicon wafer and has a transistor channel at its tip. FIG. 5C shows the completed channel structure of a SPM probe according to the present invention. The FET channel structure can be formed at the probe tip by a variety of methods. For example, a region to be a channel is first doped with impurities and both sloping sides of the channel region are doped with impurities to form a source and a drain. Alternatively, impurities for a source and drain are first doped and the center of the region is etched to form a channel region.

For the latter method, first the (100) plane of a silicon wafer is etched with precision to expose the (111) planes to be the sloping sides of the probe tip. Next, the sloping sides are doped with a first type of impurities to form a drain and source. Here, the angle between the two (111) planes is maintained at 90 degrees on a plane viewed from the top of the probe. The resulting structure is further etched to expose the (211) plane to be the sharp tip of the probe at 136 degrees on a plane viewed from the probe top. As the first type of impurities are removed from the sharp tip region, a channel region doped with a second type of impurities is exposed to define a source and drain, so that a complete FET channel structure is obtained. According to whether the first and second types of impurities implanted are n-type or p-type, a p-n-p type or n-p-n type FET channel is formed. This is the same as a common FET.

Figure 6A:
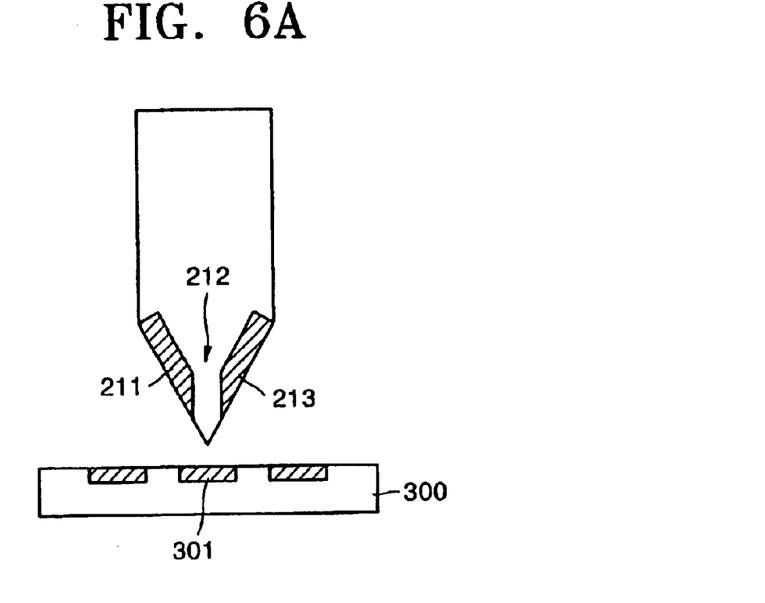
FIGS. 6A through 6C illustrate the operational principle of a metal oxide silicon (MOS) transistor formed at the probe tip.
Figure 6B:
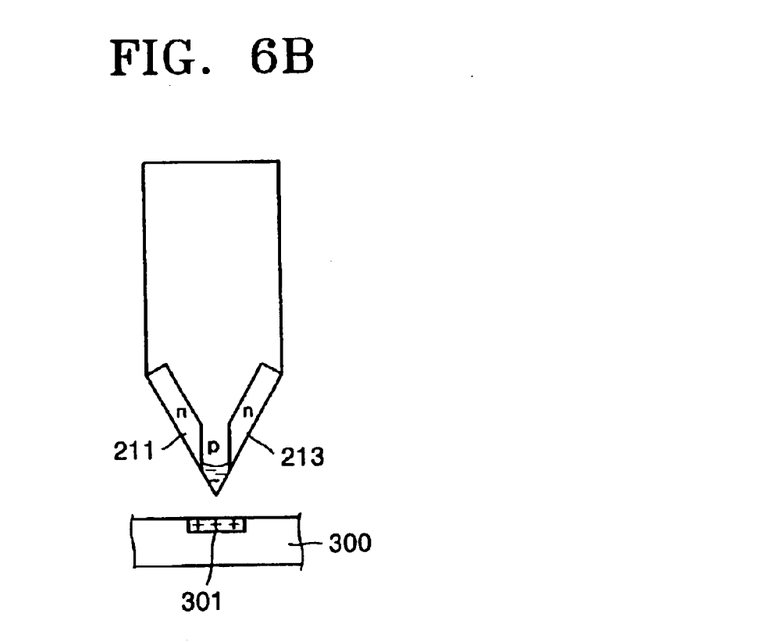
Figure 6C:
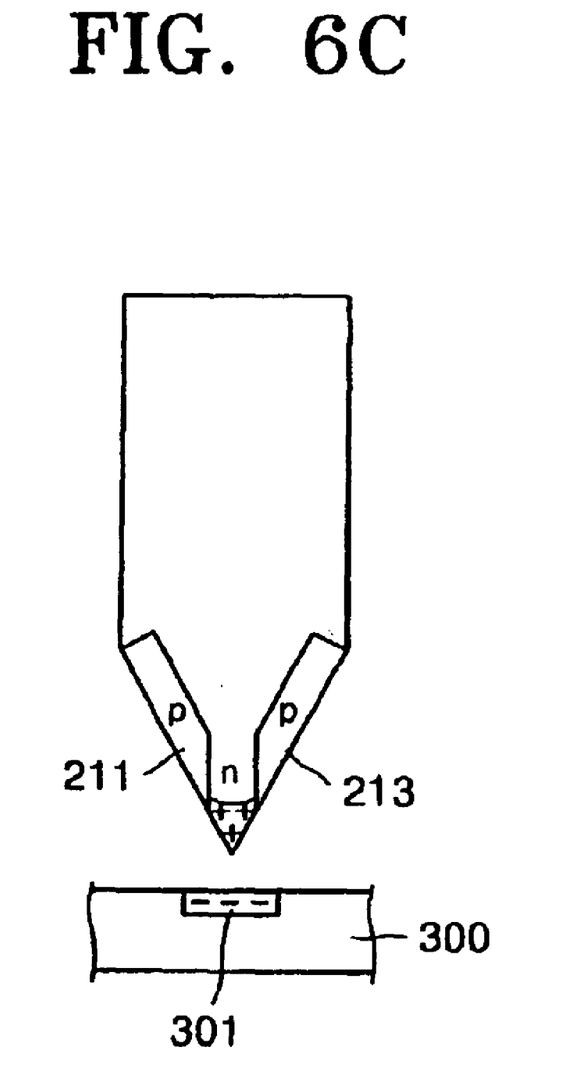

FIGS. 6A through 6C illustrate the operational principle of a MOS transistor channel formed at the tip of a probe according to the present invention. Referring to FIG. 6A, the quantity of charge varies locally in a sample 300 and when the probe having a FET channel tip passes over the sample 300, the intensity of electric field induced across the MOS transistor channel varies depending on the quantity of charge 301 trapped near the surface of the sample 300. The width of the channel 212 in the MOS transistor channel also varies depending on the electric field intensity variations, so that the amount of current flowing through the source 211 and the drain 213 changes. FIG. 6B is for an n-p-n type FET channel structure and FIG. 6C is for a p-n-p type FET channel structure.

A cantilever probe having the MOS transistor channel structure operating described above can be applied to a variety of fields, for example, for the read/write operation of a HDD or topology measurement of a semiconductor thin film. For a HDD, basically the amount of charge trapped near the surface of a hard disc and defined as 0 or 1 is sensed. The amount of drain-to-source current flow varies depending on the amount of charge gathered near the surface of the hard disc. In the case where no charge is gathered in a region near the surface of the hard disc, which is the same as when no gate voltage is applied to the FET, no current flows from the drain to the source of the FET. Meanwhile, if there is a region near the surface of the hard disc in which charges are gathered, the gate of the FET turns on and a channel along which current flows is formed between drain and source due to the gate voltage. Thus, the amount of information can be measured from a hard disc rotating at high speed in a non-contact manner with the cantilever probe operating as a FET.

On the other hands, a cantilever probe having the FET channel structure can be applied to measure the morphology of a semiconductor thin film. From the voltage-to-current ($V_{DS}$-$I_{DS}$) characteristic with respect to the variation of the distance between the sample to be measured and the tip of the SPM probe, which is measured by applying a constant voltage to the sample, it is apparent that the output and sensing characteristics of the FET type probe tip varies depending on the probe-to-sample distance. In other words, when a constant voltage is applied to a sample to be measured and the sample is scanned with the cantilever probe, the intensity of electric field applied across the FET channel of the probe varies along the uneven surface of the sample, so that the amount of current flowing through the FET channel changes. A magnified view of the morphology of a semiconductor thin film can be obtained using the SPM probe according to the present invention.

EXPERIMENT EXAMPLE 1

Figure 7:
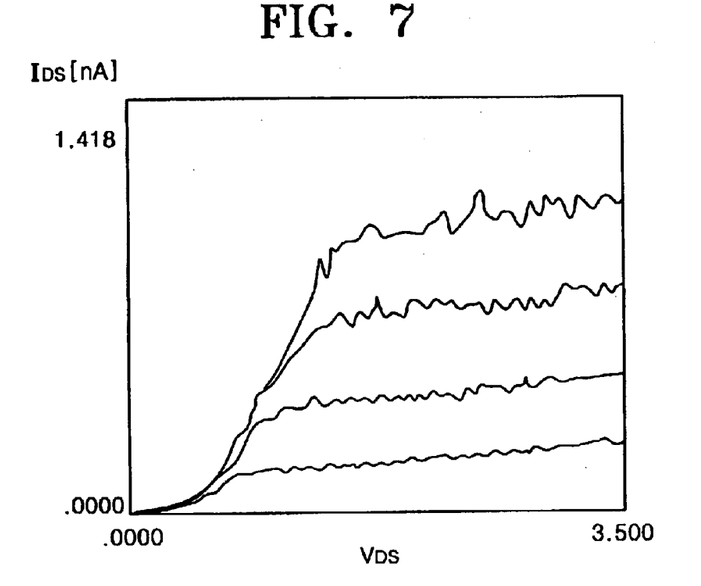
FIG. 7 is a graph of the drain-source current ($I_{DS}$) variations with respect to the drain-source voltage ($V_{DS}$) variations at various gate voltage levels for the SPM probe having the FET channel of FIGS. 5A through 5C.

The amount of current flowing through the prove having the FET channel structure with respect to the quantity of charge trapped in a sample was measured. The distance between the sample to be measured and the probe tip was kept constant and a gate voltage applied to the sample was constant for each measurement. The drain-source current ($I_{DS}$) value was measured with respect to drain-source voltage ($V_{DS}$) variations at various gate voltages. The result is shown in FIG. 7. In FIG. 7, the $V_{DS}$-$I_{DS}$ curve closest to the x-axis is for the case where no voltage is applied so that the sample has no charge. The voltage applied to the sample was varied by 5V. Due to the charges gathered near the surface of the sample, a channel is formed between the drain and source of the probe tip and the current value ($I_{DS}$) varies according to the drain-source voltage $V_{DS}$.

Figure 8:
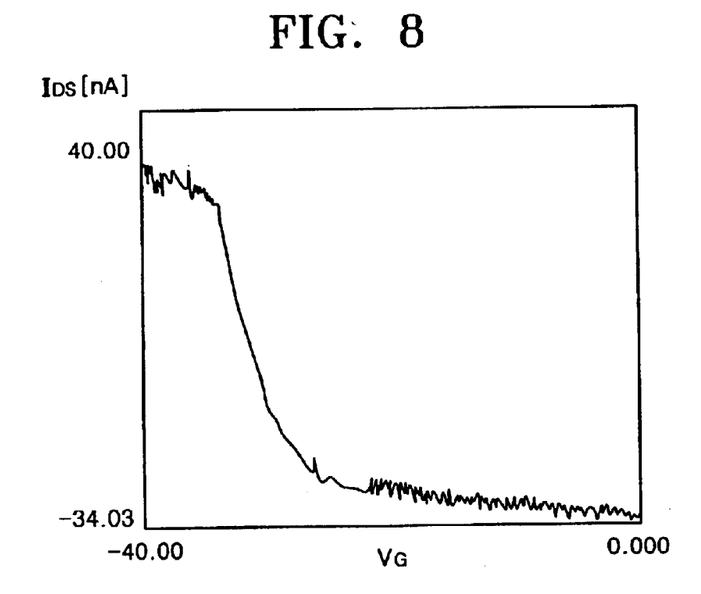
FIG. 8 is a graph of the drain-source current ($I_{DS}$) variations with respect to the gate voltage ($V_G$) applied to the sample at a constant drain-source voltage ($V_{DS}$) and at a constant sample-to-tip distance for the SPM probe having the FET channel of FIGS. 5A through 5C.

As shown in FIG. 8, the output and sensing characteristics of the FET type probe tip according to the quantity of charge trapped in the sample can be observed from the $V_{DS}$-$I_{DS}$ characteristic curve at various gate voltages. FIG. 8 is a gate voltage-to-current curve ($V_G$-$I_{DS}$) showing the current variations with respect to the voltage applied to the sample, i.e., the quantity of charge of the sample. Here, the distance between the sample and the probe tip, and the drain-source voltage ($V_{DS}$) were kept constant. As the voltage applied to the sample increases, i.e., the quantity of charge of the sample decreases and becomes close to zero, the amount of current flowing through the FET sharply decreases. As the voltage applied to the sample decreases, the amount of current exponentially increases and is saturated at a level. Information can be written onto and read from a hard disc based on these characteristics.

EXPERIMENT EXAMPLE 2

Figure 9:
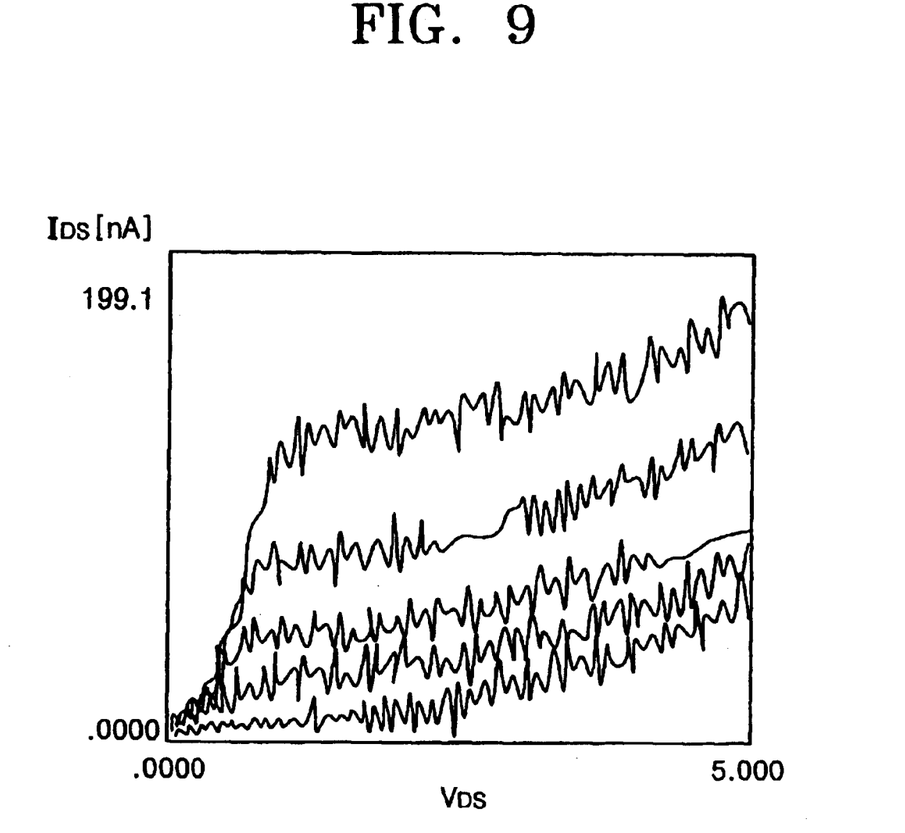
FIG. 9 is a graph of the $V_{DS}$-$I_{DS}$ characteristic with respect to the gate voltage ($V_G$) variations at a tip-to-sample distance of about 2 $\mu$m for the SPM probe having the FET channel of FIGS. 5A through 5C.

The amount of current flowing through the cantilever probe having the FET channel structure with respect to the distance between the probe tip and the sample was measured. The $V_{DS}$-$I_{DS}$ characteristic of the probe tip at the tip-to-sample distance of about 1 μm was measured at various gate voltages ($V_G$). The result is shown in FIG. 7 described in Experiment Example 1. The $V_{DS}$-$I_{DS}$ characteristic of the probe tip with respect to the gate voltage variations was measured at the tip-to-sample distance of about 2 □m. The result is shown in FIG. 9. Although the $V_{DS}$-$I_{DS}$ characteristic of FIG. 9 is greatly affected by noise, compared with that of FIG. 7, the curves of FIG. 9 show the same tendency as those of FIG. 7. The output current value of FIG. 9 is significantly lower than that of FIG. 7.

Based on the output characteristic variation which depends on the sample-to-tip distance, the morphology of the sample can be plotted in three dimensions based on the X and Y coordinates used during scanning and the associated output $I_{DS}$ values. The probe tip having the FET channel according to the present invention can be applied to an SPM system for measuring the morphology of a sample. In measuring the morphology of a sample with the probe tip according to the present invention, surface roughness of the sample has the same effect as gate thickness variation in a MOSFET. In other words, the $I_{DS}$ value varies depending on the distance between the sample and the probe tip, and thus if the drain-source voltage ($V_{DS}$) and the gate voltage ($V_G$) applied to the sample are kept constant, the morphology of the sample can be measured by scanning with the probe tip according to the present invention. The morphology of the sample can be plotted in three dimensions based on the X and Y coordinates used during scanning and the associated $I_{DS}$ values which correspond to the Z coordinates.

As described previously, the SPM probe having the FET channel structure according to the present invention is manufactured by etching a semiconductor substrate such as a single crystalline silicon wafer to form a tip, and doping the etched sloping sides the tip of the probe with impurities to form a source, channel, and drain. The SPM probe according to the present invention has the following advantages.

First, the quantity of charge of a sample can be measured.

Second, the measured charge quantity can be directly measured as a current (voltage) value, so that the need for peripheral measuring devices decreases. In other words, the overall measuring system can be miniaturized with high performance.

Third, charges can be gathered with the probe based on the charge trapping technique and the quantity of charges can be measured.

Fourth, compared to a conventional SPM probe, the charge quantity can be measured at a relatively small sample-to-probe distance. As the probe becomes closer to the sample, the sensitivity markedly improves.

Fifth, based on the fact that the electric field intensity varies depending on the distance between the probe tip and the sample, the probe according to the present invention can be applied to a 3-dimensional morphology measuring apparatus.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of fabricating a probe of a scanning prove microscope having a field-effect transistor channel, the method comprising:

forming a tip by etching a single crystalline semiconductor substrate along the (100) plane, such that one end of the V-shaped groove to be a tip has a first angle and the (111) plane is exposed at the sloping sides of the V-shaped groove;

forming a source region and a drain region by doping the sloping sides of the V-shaped groove with a first type of impurities;

etching only a center portion of the V-shaped groove at which the sloping sides having the source and drain regions doped with the first type of impurities meet to have a second angle greater than the first angle, and to remove the first type of impurities such that a channel doped with a second type of impurities is formed at the center portion of the V-shaped groove.

2. The method of claim 1, wherein the first angle is 90 degrees and the second angle is 136 degrees.

3. The method of claim 1, wherein the first type of impurities is n-type and the second type of impurities is p-type.

4. The method of claim 1, wherein the first type of impurities is p-type and the second type of impurities is n-type.

* * * * *